(No Model.)
F. W. GORDON.
CONVERTER.
No. 395,434. Patented Jan. 1, 1889.
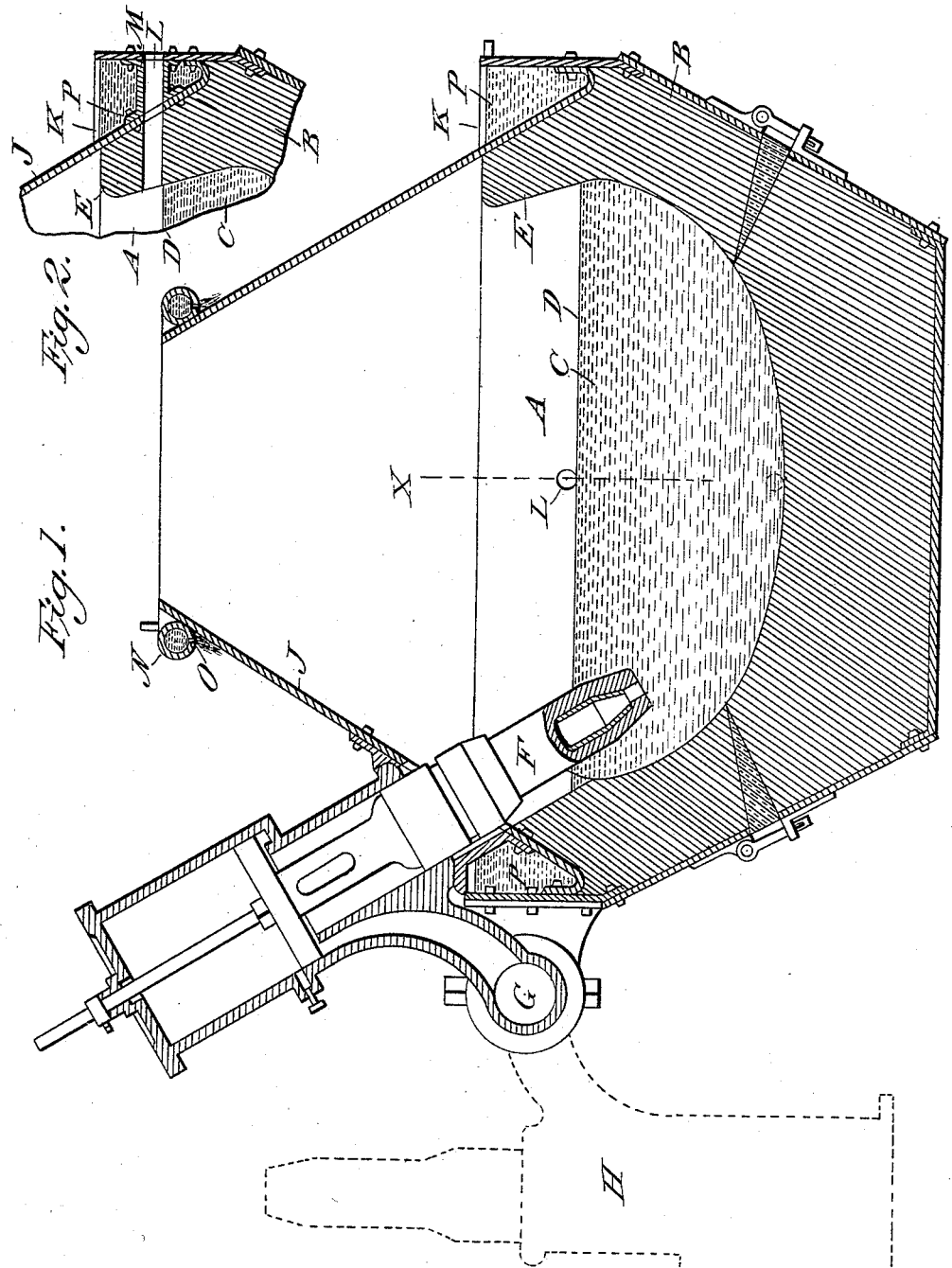
Witnesses:
W. A. Seward
A. Myers.
Fred W. Gordon Inventor:
by James W. See
Attorney

United States Patent Office.

FRED. W. GORDON, OF PHILADELPHIA, PENNSYLVANIA, ASSIGNOR TO GORDON, STROBEL & LAUREAU, OF SAME PLACE.

CONVERTER.

SPECIFICATION forming part of Letters Patent No. 395,434, dated January 1, 1889.

Application filed July 13, 1885. Serial No. 171,563. (No model.)

*To all whom it may concern:*

Be it known that I, FRED. W. GORDON, of Philadelphia, Philadelphia county, Pennsylvania, have invented certain new and useful Improvements in Converters, (Case B,) of which the following is a specification.

This invention pertains to improvements in converters for treating molten metal.

One of my objects is to provide for the elimination of phosphorus from iron. It may be well to indicate in a general way the chemical reactions taking place in converters. The effect of the oxidizing-blast is to change the silicon of the iron into silica, the silica rising and floating upon the iron as slag. The phosphorus in the iron becomes phosphoric acid, and it also rises. When the phosphoric acid joins the heated silicious slag, the phosphoric acid becomes at once decomposed and the phosphorus returns to the iron. Highly-heated silica is thus seen to be fatal to the proper elimination of phosphorus. So far as the silica of the slag is concerned its effect upon the phosphoric acid may be avoided by tapping off the silicious slag as soon as the desiliconizing process is completed, and then continuing the blow for the elimination of the phosphorus; but if the lining of the converter be silicious the phosphoric acid will be decomposed by this acid lining as soon as the phosphoric acid reaches the surface of the metal. Hence it is seen that the acid slag and the acid lining at the metal line of the converter form obstacles to dephosphorization. Snelus hoped to overcome this difficulty by using a basic lining. This was practically a failure, as the silica attacked the lime of the lining and destroyed it, making the maintenance of the lining too expensive. The phosphoric acid also attacked the basic lining, forming probably a phosphate of lime. A basic material may contain about thirty per cent. of silica and still take up phosphorus and form a phosphate; but if the silica be in excess of thirty per cent. such will not be the case. Thus it will be seen that Snelus's plan resulted in a lining which became rapidly eroded in satisfying the silica of the slag, and that the silica of the slag decomposed the phosphoric acid. Thomas and Gilchrist advanced the art by employing the basic lining of Snelus in combination with charges of basic material. The lime addition was in sufficient quantity to satisfy the silica of the slag and thus save the lining, and also sufficient to keep the silica of the slag below thirty per cent. The expense of the linings, however, involved in the basic process is in many localities so great as to more than compensate for the advantage which the basic process offers in the utilization of phosphoritic ores. The practical manufacturing question has thus narrowed itself down to the cost of non-phosphoritic ores as against the cost of dephosphorizing by a basic process.

In my improved converter I use an acid lining; but I cool it at the metal line, so that its effect is neutral, thus forming a dissimilar lining of a single material—in other words, an acid lining with a neutral zone at the metal line. The silicious slag of course does no harm to the acid lining, and this slag may, if desired, be tapped off to avoid its effect on the phosphoric acid during the process of dephosphorization. I, however, use basic additions, and, instead of tapping the silicious slag off, the additions may be in quantities sufficient to keep the excess of silica in the slag down. In practice I propose to tap off the slag and then add lime to receive the phosphoric acid and form a phosphate which is also to be tapped off.

During the blowing process a violent eruptive ebullition takes place in the converter, and it is evident that if the phosphoric slag is thrown against the silicious roof of the converter the phosphoric acid will be decomposed and the phosphorus return to the iron. I avoid these evils by two different plans. One is to cool the roof of the converter below the temperature at which the silicious lining can do harm; the other is to dispense entirely with the roof of the converter. The latter type of converter forms the subject-matter of another application for a patent, and will not be described in detail here.

In the roofed converter I use a neutral material for the roof; but it is evident that the splashings of slag will soon give this neutral material an adhering coating of silicious slag, so that in course of time it becomes in fact an acid roof or basic from splashings of basic slag formed by basic additions.

It is a commonly-accepted theory that phosphoric acid is formed at once when the oxygen of the blast meets the phosphorus of the iron, and it is known that heated silica decomposes phosphoric acid. A tuyere-opening consisting of a mere opening in the converter-wall would then be productive in forming phosphoric acid immediately at its mouth, and if the wall be silicious then the decomposition of the phosphoric acid takes place at once, even if the formation of the phosphoric acid be not thereby prevented. A tuyere consisting of a mere opening in the silicious wall is thus seen to be an obstacle to the dephosphorizing process and to be itself subjected to erosion. The upward currents are particularly directed upward along the lining of the converter, and it follows that the mere wall-port for the tuyere presents a most unhappy combination of means for forming phosphoric acid and means for at once decomposing phosphoric acid as it moves upward along the lining.

My invention meets these evils by protruding the tuyere bodily into the metal, so as to avoid the strong upward currents of phosphoric acid against the acid lining. A tuyere protruding from the wall of a converter inward into the metal would, if of acid material, avoid the effect of the action of the silicious wall by causing the currents to pass farther away from the wall; but the mouth of the tuyere, after all, presents an acid decomposing agent directly at the point where the phosphoric acid is said to be formed. Hence a protruding acid tuyere is not by any means perfect. If the tuyere be of basic material, then we must face the problem of the juncture between a basic tuyere and an acid wall. There would be a destructive antagonism at this juncture. Silicate of lime would be formed as the result of the contact of the acid and base, and the tuyere juncture would be destroyed. Hence the material of the tuyere must be neutral in order that it may not serve to decompose the phosphoric acid when formed and in order that it may not cause destruction at its juncture with the acid lining, the latter consideration calling for a tuyere which shall at least be neutral at its point of juncture with the acid lining. The neutral tuyere may be formed of iron or of magnesia or bauxite. Magnesia is, chemically considered, a basic material; but in practice it is found that it is acted on by the silica very slightly, and thus becomes, in practice, a neutral material.

The practical construction of tuyeres of neutral material is a matter involving much difficulty in the present state of the art. Hence I prefer to employ a basic tuyere and avoid joints at the acid lining.

A basic tuyere may be formed of dolomite, and the juncture with the acid lining may be avoided by dipping it into the material from above. My invention therefore has reference to a converter having its acid lining cooled at the metal line to avoid its effect upon phosphoric acid and to avoid the effect upon it of basic slag; of a neutral converter-hood to avoid the effect of an acid-lined hood upon the splashings of the phosphoritic slag; of a cooled hood to avoid the effect upon the phosphoritic slag of silicious splashings adhering to the hood; of a tuyere protruding into the metal and discharging its oxygen away from the acid lining of the converter; to avoid the evils due to the formation of phosphoric acid in immediate proximity to the acid lining; to a neutral or basic tuyere dipping into an acid-lined vessel free from juncture with the acid lining; to avoid the destruction resulting from the combination of an acid and a base, and to details of construction herein more fully explained.

I illustrate my invention in the accompanying drawings, in which—

Figure 1 is a vertical section through a fixed converter, and Fig. 2 a vertical section through a portion of the same at the line X of Fig. 1.

In the drawings, A indicates the bowl of the converter; B, the acid lining thereof; C, the molten metal therein; D, the top of the molten metal, spoken of herein as the metal line; E, that portion of the converter-lining which is contiguous to the metal line; F, a tuyere formed of basic material and dipping into the molten metal over the edge of the bowl; G, the blast-pipe to which the tuyere structure is hinged; H, dotted lines indicating the position of the tuyere structure when swung backward; J, a contracted iron hood over the bowl of the converter; K, a water-tight trough around the outside of the portion E of the converter-lining; L, a hole through the converter-wall above the metal line for tapping off the slag; M, a neck across the trough K, forming the slag-passage through the trough; N, a water-pipe around the top of the hood; O, a row of jet-holes in the bottom of said pipe, and P water in the trough.

The pipe N is to be connected with a source of water-supply, and the trough K has a discharge-pipe to prevent overflow. The tuyere is arranged to be reciprocated into and out of the metal by means of a pneumatic engine involved in the tuyere structure. This tuyere structure is involved in the subject-matter of an application for Letters Patent filed by me May 22, 1885, and will not be herein described in detail. Suffice to say that the structure permits the quick insertion and withdrawal of a tuyere, so that the time of blow may be accurately controlled and the time of subjection of the tuyere to destruction materially lessened. The portion E of the converter-lining is kept so cold by the water, P, that the lining at this point does not act upon the phosphatic slag and is not acted upon by the basic slag. The water showering from the pipe N keeps the hood cool and supplies the trough. The hood, as a neutral hood, is thus preserved, and the slag which adheres to its interior is kept at so low a temperature as to be without evil effect. The trough is formed by the metal of the hood being continued downward past the rim of the lining and being joined watertight to the exterior shell of the converter. The hood also thus forms an upwardly-contracted shell for the rim of the lining, whereby the lining is prevented from rising. The slag-hole L is partly in the cool lining and partly in the water-cooled neck M. The tuyere dips into the top of the metal, and the blast from it will take an upward and inward course away from the lining of the converter. The tuyere is connected to the blast-pipe by a connection over the rim of the vessel, whereby contact between the tuyere and the acid lining of the vessel is avoided.

In the operation of conversion the tuyere is dipped the instant the blast is called for, and the blowing is continued to such point of desiliconization as may be desired. The silicious slag, if desired, is then tapped off and the basic additions added, after which the blow is continued until the phosphorus is eliminated, when the phosphatic slag may be tapped off. The tuyere may be withdrawn from the metal at any time when the blast is not wanted, whereby the tuyere is saved from unnecessary destruction.

Instead of tapping the silicious slag off preparatory to the dephosphorizing blow, sufficient lime may be charged in the additions to neutralize the effect of the silica in the slag.

It has been proposed to so modify furnaces having water-cooled linings as to adapt them to the Bessemer process of conversion, and it has been proposed to place water-coils in the lining of converters, and it has been proposed to inject water above the metal in a converter, and it has been proposed to use an iron converter cooled by water. To cool the lining of a converter for the purpose of preserving the lining is an old idea not at all original with me; but, so far as I know, a converter has never heretofore been proposed with an acid lining-zone below the metal and with a neutral lining-zone at and above the metal line, nor am I advised that it has ever been proposed to dephosphorize in a converter with dissimilar zones, as herein described by me, nor, so far as I know, has it ever been proposed to produce dissimilar zones in a converter by neutralizing a zone of an entirely acid lining by cooling it to prevent the reactions heretofore mentioned.

It has been proposed to employ acid tuyeres in converting-vessels having acid linings, and it has been proposed to employ neutral tuyeres in converters having either neutral or acid linings, and it has been proposed to use basic tuyeres and neutral tuyeres in basic-lined converters, and tuyeres of various kinds have been arranged in converters free of contact with the lining of the vessel; but, so far as I know, I am the first to propose the combination of an acid-lined converter with basic tuyeres arranged free of contact with the acid lining to prevent the reactions heretofore referred to.

To arrange hoods and plates of metal over metallurgical furnaces and preserve the same from destruction by water-cooling has heretofore been proposed; but, so far as I know, I am the first to propose combining an acid-lined converter with a neutral zone at the metal line and a water-cooled hood over the vessel to prevent the reactions referred to.

I claim as my invention—

1. In a dephosphorizing-converter, the combination of an acid lining-zone below the metal line and a neutral lining-zone at the metal line, substantially as and for the purpose set forth.

2. In a dephosphorizing-converter, the combination of an acid lining-zone below the metal line and a neutral lining-zone extending from the top of the acid zone upward to or above the slag, substantially as and for the purpose set forth.

3. In a dephosphorizing-converter, the combination of an acid lining-zone below the metal line, a neutralized acid lining-zone at the metal line, and a cooling-channel in the neutral zone of the lining, substantially as and for the purpose set forth.

4. In a dephosphorizing-converter, the combination of an acid lining-zone below the metal line, a neutralized acid lining-zone at the metal line, a cooling-channel in the neutral zone of the lining, a hood of neutral material reaching upward from the neutralized lining-zone, and means for distributing a cooling agent contiguous but exterior to the splash-receiving surface of the hood, substantially as and for the purpose set forth.

5. In a converter, the combination of a converting-vessel, an acid lining therefor, and a tuyere formed of basic material and disposed free of contact therewith, substantially as and for the purpose set forth.

6. In a converter, the combination of a converting-vessel having a metal shell, an acid lining therefor, a hood joining said shell at about the metal line of the converter and converging upward to a top opening, an annular shower-pipe at the top of the hood, and a trough at the foot of the hood around the lining at the metal line, substantially as and for the purpose set forth.

FRED. W. GORDON.

Witnesses:
EDWARD B. FULLERTON,
JNO. TAYLOR.